United States Patent [19]
Phillips et al.

[11] Patent Number: 6,137,281
[45] Date of Patent: Oct. 24, 2000

[54] MAGNETIC BACK-TO-BACK LOCATOR

[75] Inventors: Scott G. Phillips, Harvest; Richard Allen Venable, Grant; W. B. Clifton, Madison, all of Ala.

[73] Assignee: Lockheed Martin Corporation, New Orleans, La.

[21] Appl. No.: 09/080,047

[22] Filed: May 15, 1998

[51] Int. Cl.$^7$ .............................. G01R 33/02; G01B 7/00
[52] U.S. Cl. ....................... 324/67; 324/207.17
[58] Field of Search ................ 324/67, 207.22, 324/207.24, 207.23, 207.2, 226, 260, 262, 207.21, 207.16, 346, 207.26, 207.17, 258; 369/13

[56] References Cited

U.S. PATENT DOCUMENTS

| | | | |
|---|---|---|---|
| 4,307,617 | 12/1981 | Greer et al. | 75/753 |
| 4,536,710 | 8/1985 | Dunham | 324/244 |
| 4,675,993 | 6/1987 | Harada | 29/740 |
| 4,859,931 | 8/1989 | Yamashita et al. | 324/67 |
| 5,008,619 | 4/1991 | Keogh et al. | 324/207.16 |
| 5,017,873 | 5/1991 | Rippingale et al. | 324/326 |
| 5,418,455 | 5/1995 | Takaishi et al. | 324/207.21 |
| 5,434,500 | 7/1995 | Hauck et al. | 324/67 |
| 5,559,433 | 9/1996 | Onizuka | 324/207.21 |
| 5,572,120 | 11/1996 | Takaishi et al. | 324/207.21 |
| 6,018,505 | 1/2000 | Miyatake et al. | 369/13 |

*Primary Examiner*—Christine K. Oda
*Assistant Examiner*—Anthony Jolly
*Attorney, Agent, or Firm*—W. H. Meise; T. G. Fierke

[57] ABSTRACT

A back-to-back locator instrument includes a first portion with an array of two or more magnetic sensors, and an indicator arrangement. A second portion of the instrument includes an array of correspondingly located magnets. Each of the first and second portions includes a marking arrangement, which either allows marking of the underlying surface, or viewing of a mark on the surface for properly locating the instrument portion thereon. When the two portions are congruent or registered, the indicator arrangement gives a maximum indication of corresponding locations. In a particular use, corresponding locations on the inside and outside of a tank are identified. The indicator arrangement may include a separate indicator for each magnetic sensor. A flux concentrator may be associated with each magnetic sensor.

10 Claims, 6 Drawing Sheets

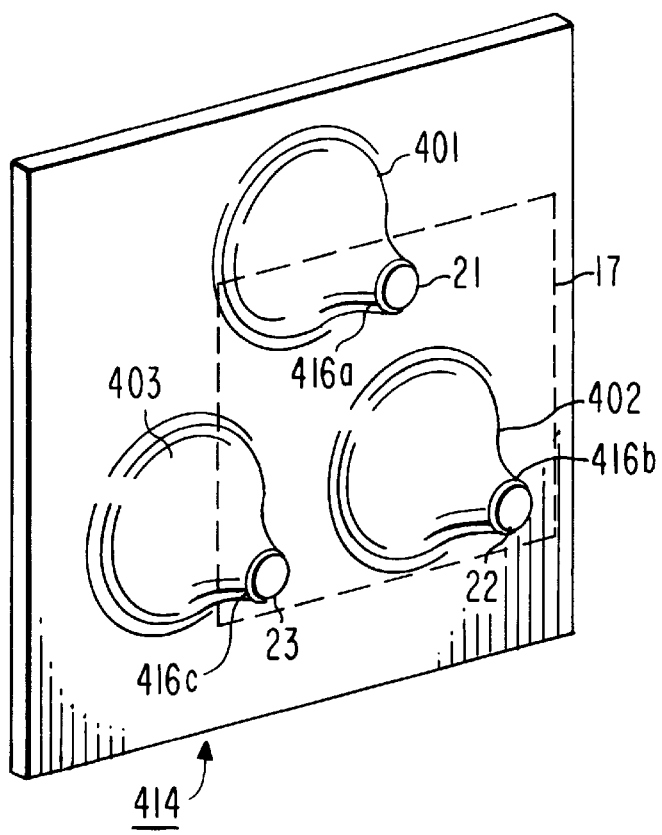
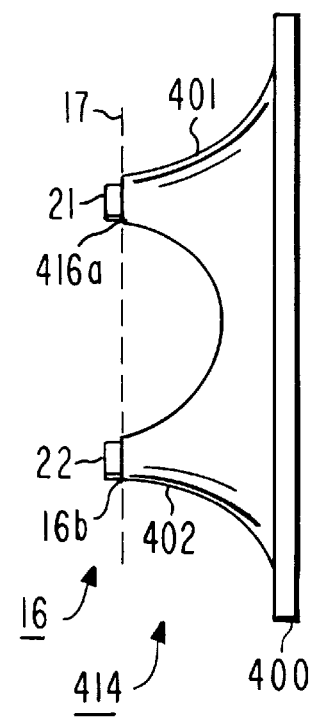
Fig. 4a  Fig. 4b
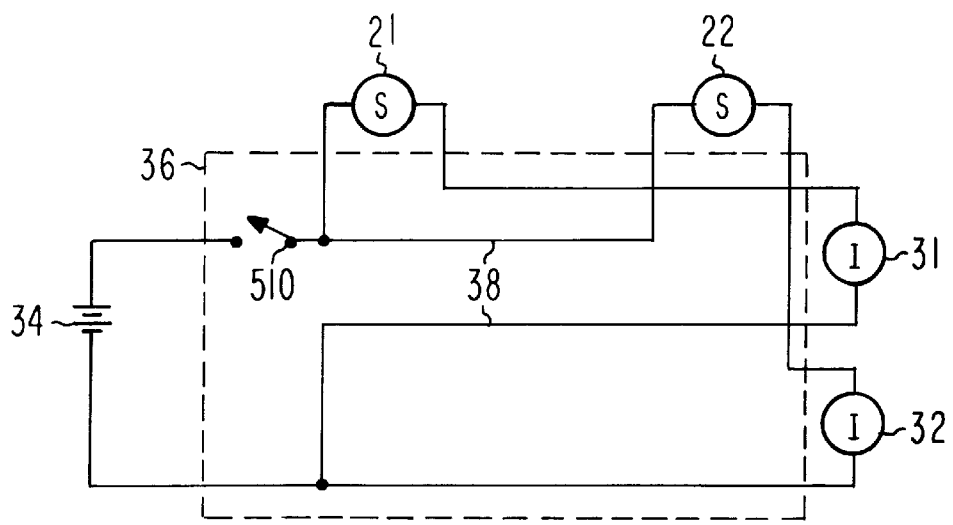
Fig. 5

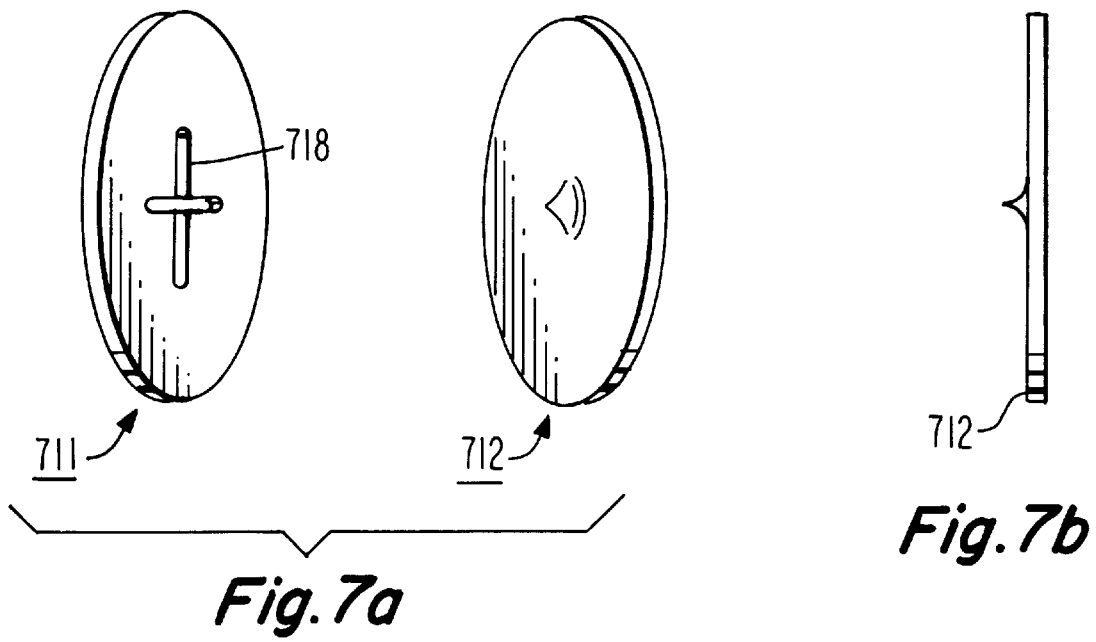
Fig. 7a
Fig. 7b
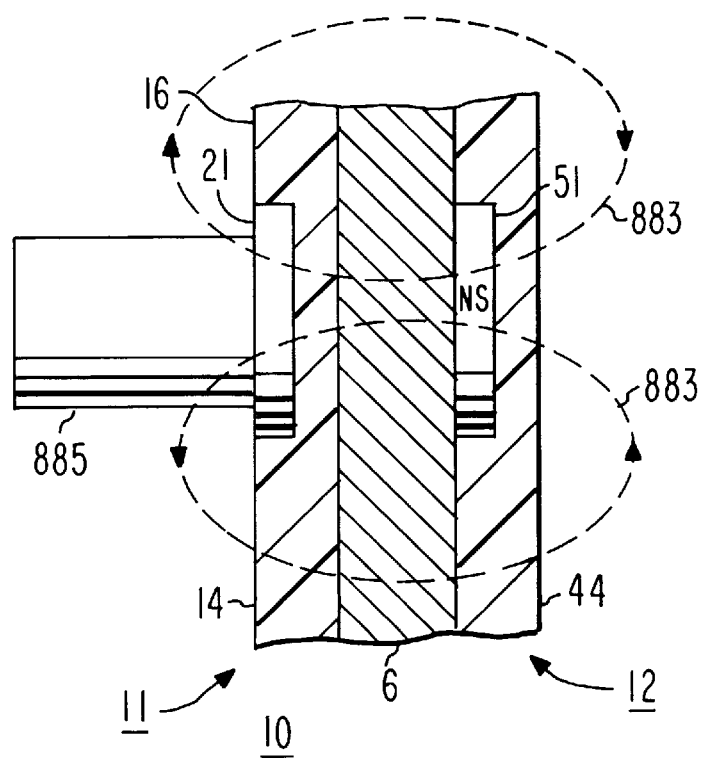
Fig. 8

MAGNETIC BACK-TO-BACK LOCATOR

The invention described herein was made in the performance of work under NASA contract No. 36200 and is subject to the provisions of Section 305 of the National Aeronautics and Space Act of 1958 (42 U.S.C. 2457).

FIELD OF THE INVENTION

This invention relates to instruments for locating coinciding locations on the facing sides of an object by the use of magnetic generators and sensors.

BACKGROUND OF THE INVENTION

Testing of some structures, such as the external fuel tank for the Space Shuttle, requires placing of strain sensors on both the interior and exterior surfaces of the tank at corresponding locations.

Improved location methods are desired.

SUMMARY OF THE INVENTION

A bipartite instrument according to an aspect of the invention is used for establishing coincident locations on both sides of a structure having first and second opposed surfaces. The instrument includes (A) a first portion, which first portion includes a mounting defining a generally planar mounting surface, and a first marking arrangement for marking a surface placed adjacent to the planar mounting surface. The first portion and the second portion are separate items which are capable of being moved independently of each other. The first portion of the instrument also includes first and second magnetic field sensors mounted, at disparate locations equidistant from the first marking arrangement, adjacent the surface of the first portion of the instrument. Each of the sensors is electrically responsive to the presence of a magnetic field, by producing an electrical signal or changing resistance or other electrical characteristic. The first portion of the instrument further includes first and second electrically operated indicators associated with each of the first and second sensors, respectively, for, when electrically actuated, producing a sensible indication. The first portion of the instrument further includes a source of electrical energy, such as a battery or a mains-operated power supply, and a controller coupled to the first and second sensors, to the first and second indicators, and to the source of electrical energy, for responding to the electrical response of each of the first and second sensors by energizing the first and second indicators, respectively.

The second portion of the instrument includes a mounting defining a generally planar mounting surface, and a second marking arrangement for marking a surface placed adjacent to the planar mounting surface of the second portion of the instrument. First and second magnetic field generators are mounted adjacent to the surface of the second portion of the instrument, at locations substantially congruent with the locations of the first and second sensors under conditions in which (a) the planar mounting surfaces of the first and second portions of the instrument are juxtaposed, with the first and second marking arrangement registered, and (b) the first and second surfaces are relatively rotated to register the first sensor with the first magnetic field generator.

In a particular embodiment of the invention, at least one of the first and second magnetic field generators comprises a permanent magnet.

In another embodiment of the invention, at least one of the first and second marking arrangements comprises an aperture extending through its corresponding mounting, with the aperture being sufficiently large to accommodate a marking implement such as a pencil or scribe. In a particularly advantageous embodiment of the invention, the locations of the first marking arrangement and the first and second sensors lie in a straight line. The first and second magnetic field generators are preferably dimensioned to produce substantially identical magnetic fields, and the first and second sensors are selected or adjusted to have substantially identical responses to the magnetic fields.

The most advantageous embodiment of the invention includes at least three sensors on the first portion, and three magnetic field generators at corresponding locations on the second portion, for providing an indication in two mutually orthogonal dimensions.

A method according to an aspect of the invention identifies corresponding locations on either side of a substantially planar object including first and second mutually parallel first and second broad walls. The method comprises the step of selecting a first location on the first broad wall of the object, for which the corresponding location on the second broad wall is to be located, and placing a first portion of a bipartite instrument adjacent the first broad surface of the object. The first portion of the bipartite instrument comprises (a) a mounting defining a generally planar mounting surface, and a first marking arrangement for marking a surface placed adjacent to the planar mounting surface of the first portion of the instrument, (b) first and second magnetic field sensors mounted, at disparate locations equidistant from the first marking arrangement, adjacent the surface of the first portion of the instrument, with each of the sensors being electrically responsive to the presence of a magnetic field, (c) first and second electrically operated indicators associated with each of the first and second sensors, respectively, for producing a sensible indication when electrically actuated (d) a source of electrical energy, and (e) a controller coupled to the first and second sensors, the first and second indicators, and to the source of electrical energy, for responding to the electrical response of each of the first and second sensors by energizing the first and second indicators, respectively, with the first marking arrangement over one of the first location on the first broad surface and the corresponding location on the second broad surface. The method further includes the step of placing a second portion of the bipartite instrument adjacent the other one of the first location on the first broad surface and the corresponding location on the second broad surface of the object. The second portion of the bipartite instrument comprises (f) a mounting defining a generally planar mounting surface, and a second marking arrangement for marking a surface placed adjacent to the planar mounting surface of the mounting of the second portion of the instrument, (g) first and second magnetic field generators mounted adjacent to the surface of the second portion of the instrument, at locations substantially congruent with the locations of the first and second sensors under conditions in which (a) the planar mounting surfaces of the first and second portions are juxtaposed with the first and second marking arrangement registered and (b) the first and second surfaces are relatively rotated to register one of the first and second marking arrangement, at a location at which at least on of the first and second indicators gives an indication. The method further includes the step of adjusting the position of at least one of the first and second portions of the instrument until both the first and second indicators provides an indication, followed by the step of marking one of the first and corresponding locations by use of the marking arrangement.

In a particular mode of the method, the locations of the first marking arrangement and the first and second sensors lie in a straight line, and the straight line is one of vertical and horizontal; and the method includes the step of adjusting the position includes the step of moving the one of the first and second portions with the straight line held the one of vertical and horizontal.

In a further mode of the method according to the invention, at least one of the first and second marking arrangements comprises an aperture extending through the mounting sufficiently large to accommodate a marking implement, and the step of marking comprises the step of marking one of the first and second broad surfaces through the aperture.

BRIEF DESCRIPTION OF THE DRAWING

FIGS. 4a and 4b are perspective and side views, respectively, of a mounting for a first portion of the instrument in which the mounting surface is planar but not flat;

FIG. 5 is a simplified schematic diagram of an electrical arrangement for controlling indicators from a particular type of magnetic sensor;

FIGS. 7a and 7b together illustrate another embodiment of the invention; and

FIG. 8 is a cross-sectional view of a portion of an instrument and planar structure, illustrating adjacent magnetic source and sensor, and also illustrating a magnetic flux concentrator mounted on the magnetic sensor.

DESCRIPTION OF THE INVENTION

Figure 1A:
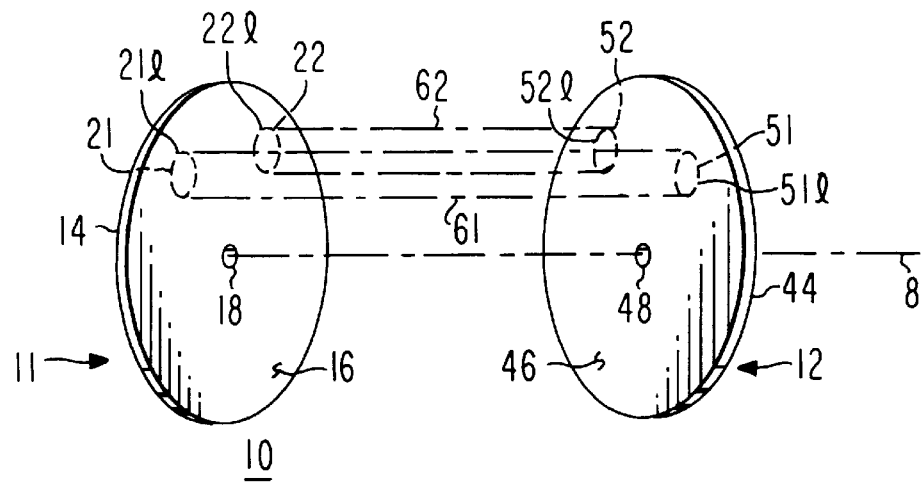
FIGS. 1a and 1b are simplified perspective or isometric view of first and second portions of an instrument according to an aspect of the invention, in which the magnetic sensors and a marking aperture make a triangle and the mountings of the first and second portions are circular.
Figure 1B:
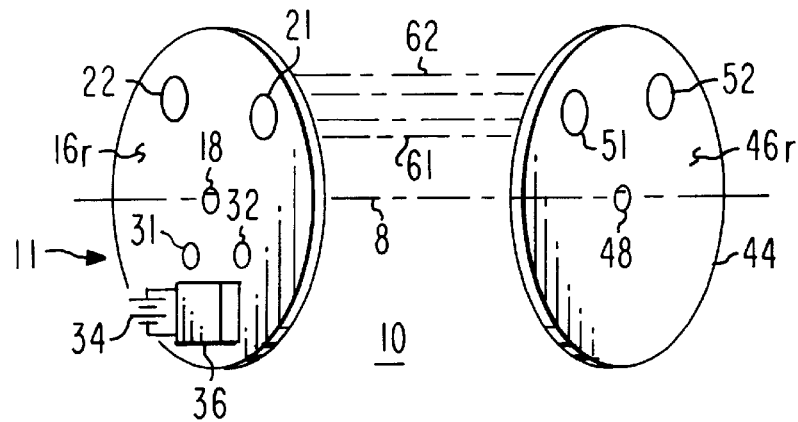
Figure 1C:
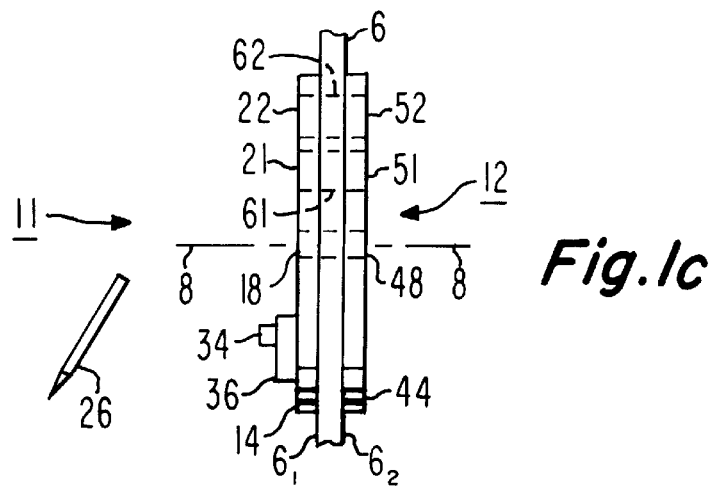
FIG. 1c is a cross-sectional view of the first and second portions of FIGS. 1a and 1b associated with a planar structure.

FIGS. 1a, 1b, and 1c illustrate an instrument according to an aspect of the invention. In FIGS. 1a, 1b, and 1c, an instrument 10 includes a first portion 11 and a second portion 12. First portion 11 includes a disk-like mounting or base, 14, which is generally circular, and has a planar surface 16. A central through aperture 18 provides access for marking a surface, as described below. A first magnetic sensor 21 is placed at a location, designated 21l, adjacent mounting surface 16, and a second magnetic sensor 22 is placed at a location designated 22l, adjacent mounting surface 16. Location 21l is at a different distance from central aperture 18 than location 22l.

FIGS. 1a, 1b, and 1c also illustrate a second portion 12 of instrument 10. Second portion 12 includes a disk-like mounting 44 with a mounting surface 46 and a marking arrangement in the form of a central through aperture 48. A first magnetic field generator in the form of a permanent magnet 51 is placed at a location, designated 51l, adjacent mounting surface 46, and a second magnetic field generator, in the form of a second permanent magnet 52, is placed at a location designated 52l on mounting 44.

Mounting 14 of first portion 11 of instrument 10 is made from a nonmagnetic material, such as plastic or aluminum, at least in the region of sensors 21 and 22, in order to avoid affecting the magnetic fields which are to be sensed.

As illustrated in FIG. 1a, surfaces 16 and 46 of mountings 14 and 44, respectively, face each other, with an axis 8 passing through their central apertures 18, 48, orthogonal to the mounting surfaces 16, 46. With this orientation of the first and second portions 11 and 12, respectively, of instrument 10, the locations 21l and 22l of the magnetic sensors 21 and 22 on mounting 14 of first portion 11 of instrument 10 are selected to correspond or coincide with the locations 51l and 52l of magnetic field generators 51 and 52 on the second portion 12 of instrument 10, as suggested by projection lines 61 and 62, respectively. As illustrated in FIG. 1a, the marking aperture 18 makes a triangle with sensor locations 21l and 22l. Also, marking aperture 48 of mounting 44 makes a similar or congruent triangle with magnet locations 51l and 52l.

FIG. 1b illustrates first and second portions 11 and 12, respectively, of instrument 10, showing mounting surfaces 16r and 46r, which are on the opposite sides of the mountings 14, 44 from the surfaces 16 and 46, respectively. As illustrated, side 16r of mounting 14 of first portion 11 bears a first electrically actuated indicator 31 and a second electrically actuated indicator 32, and also bears an electrical energy source illustrated as a battery 34. Battery 34 is illustrated as being connected to a controller illustrated as a box 36. Controller 36 interconnects electrical source 34, magnetic sensors 21 and 22, and indicators 31 and 32, in such a manner that indicators 31 and 32 provide an indication of the magnetic flux at locations 21l and 22l, respectively. The material of mounting 44 is nonmagnetic, at least in the region of magnetic field generators 51 and 52.

In a very simple embodiment of the invention illustrated in FIG. 5, the magnetic sensors (S) 21 and 22 are magnetoresistive elements which change resistance as a function of magnetic flux, indicators (I) 31 and 32 are light-emitting solid-state devices such as light-emitting diodes (LEDs), and controller 36 comprises or includes a switch 510 and wiring 38, which, when switch 510 is closed or conductive, interconnects sensor 21 in series with indicator LED 31 across battery 34, and interconnects sensor 22 in series with indicator LED 32 across battery 34. Such connections allow the current flow in indicator 31 to be controlled by the resistance of sensor 21, which in turn is established by the magnetic field in the vicinity of location 21l of FIG. 1a. Similarly, the connections of FIG. 5 allow the current flow in indicator 32 to be controlled by the resistance of sensor 22, which in turn is established by the magnetic field in the vicinity of location 22l of FIG. 1a.

FIG. 1c illustrates the two portions 11 and 12 of instrument 10 of FIGS. 1a and 1b juxtaposed to a planar structure 6. More particularly, first portion 1 of instrument 10 has its surface 16 adjacent to a first side $6_1$ of planar structure 6, and second portion 12 of instrument 10 has its surface 46 adjacent to a second side $6_2$ of planar structure 6. As illustrated, the central apertures 18, 48 are coaxially aligned with axis 8. The axial orientation of the first and second portions 11 and 12 of instrument 10 relative to axis 8 in FIG. 1c is such that the lengths of projection lines 61, 62 is minimized, which is to say that magnet 51 is as close to sensor 21 as the thickness of structure 6 permits, and magnet 52 is as close to sensor 22 as the thickness of structure 6 permits. To use other language, the sensors 21, 22 are superposed over magnets 51, 52.

In the position of the first and second portions 11 and 12 of instrument 10 illustrated in FIG. 1c, the magnetic field strength produced by magnet 51 at sensor 21 location 21*l* is at a maximum, and the magnetic field strength produced by magnet 52 at sensor 22 location 22*l* is also at a maximum. If either the first portion 11 or the second portion 12 of instrument 10 is translated or moved along the surface 6$_1$ or 6$_2$, respectively, as by upward or downward movement from the position illustrated in FIG. 1c, the magnetic field strength at sensor locations 21*l* and 22*l* will be decreased from the maximum value of magnetic field. Thus, translation of either first portion 11 or second portion 12 of instrument 10 from the position illustrated in FIG. 1c reduces the indication produced on indicators 31 and 32.

Those skilled in the art know that the magnetic field strength of a magnetic field generator falls off very rapidly with increasing distance from the generator, so that a sensor such as 22 will not respond, or will respond very weakly, to a magnet on which sensor 21 is superposed. The strength of the magnets will, of course, have to be selected in conjunction with the distances between sensors in order to avoid undesirable interaction. Such selection is very simple, and readily accomplished.

In use of the indicator 10 of FIGS. 1a, 1b, and 1c is accomplished by placing the surface 16 of the mounting 14 of first portion 11 on (or against) side 6$_1$ of the structure on which corresponding locations are to be found, and placing surface 46 of mounting 44 of second portion 12. The controller 36 is placed in operation, which may simply require enabling switch 510. First portion 11 of the instrument 10 is moved about on surface 6$_1$ of the structure 6, while observing the indicators 31 and 32. When one of the indicators gives an indication, the position of first portion 11 is adjusted to maximize the indication of the one of the indicators. The maximization of the indication of one of indicators 31 or 32 evidences that the associated one of the sensors 21 or 22 is superposed over one of the magnetic field generators. With any luck, either sensor 21 will be overlying magnetic field generator 51, or sensor 22 will be overlying magnetic field generator 52, so simple rotation of the first portion 11 about the position 21*l* or 22*l*, as appropriate, will cause the other one of the indicators to give a maximum indication. When both indicators 31 and 32 give a maximum indication, the two portions are aligned, and axis 8 passes through both marking apertures 18, 48. The position of the first portion 11 is held, and a scribe or pencil (26 of FIG. 1c) is used to mark surface 6$_1$ through marking aperture 18, and to mark surface 6$_2$ through marking aperture 48.

As mentioned, some luck is required when positioning the first and second portions 11 and 12 of FIGS. 1a, 1b, and 1c. This is because the distances between sensor locations 21*l* and central aperture 18 is different from the distance between sensor location 22*l* and central aperture 18. If sensor 21 happens to be superposed over magnetic field generator 52 when the first indication of coincidence is achieved, rotation of the first portion 11 will not necessarily bring the first and second portions of instrument 10 into registry. This disadvantage is solved by the arrangement of FIG. 2.

Figure 2:
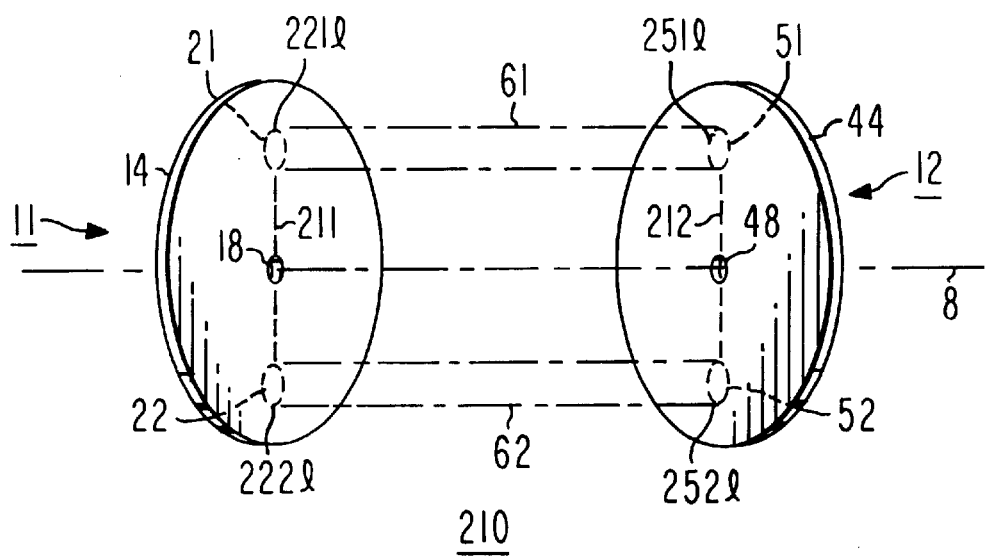
FIG. 2 is a simplified perspective or isometric view of first and second portions of an instrument according to an aspect of the invention, in which the magnetic sensors and the marking aperture lie in a line.

The instrument 210 of FIG. 2 is similar to instrument 10 of FIGS. 1a, 1b, and 1c, except in that the locations 221*l* and 222*l* of the first and second magnetic field sensors 21 and 22, respectively, are located antipodally, or diametrically opposite each other on a diametric line 211, and equidistant from central marking aperture 18. The characteristics of second portion 12 of the instrument 210 track those of first portion 11. More particularly, magnetic field generators 51 and 52 are at antipodal locations 251*l* and 252*l* on a diametric line 212. With the arrangement of FIG. 2, coincidence of either sensor with one of the magnetic field generators of necessity allows the other pair to be made coincident by simple rotation of the first portion (or the second portion, for that matter) about that one of the indicators providing the maximum indication. Thus, no luck is required in manipulating the instrument to achieve coincidence of the marking apertures as described above.

The arrangement of FIG. 2 has another advantage, in that the diametric lines can be held in a fixed orientation relative to local vertical, to speed up the locating steps. More particularly, if the second portion 11 of the instrument 10 is mounted on the second side 6$_2$ of the structure 6 with its diametric line 212 vertical, and the first portion 11 of the instrument 10 is held with its diametric line 211 vertical while moving the second portion about to provide approximate location, there is twice as great a chance of superposing one sensor/generator pair than if the orientation of the diametric lines is not controlled. This should speed the initial approximate location. Also, once the approximate location is found by a maximum indication of one of the indicators 31 or 32, the first portion must only be translated upward or downward by the distance between the sensors in order to locate the final position, rather than requiring a rotation.

Figure 3:
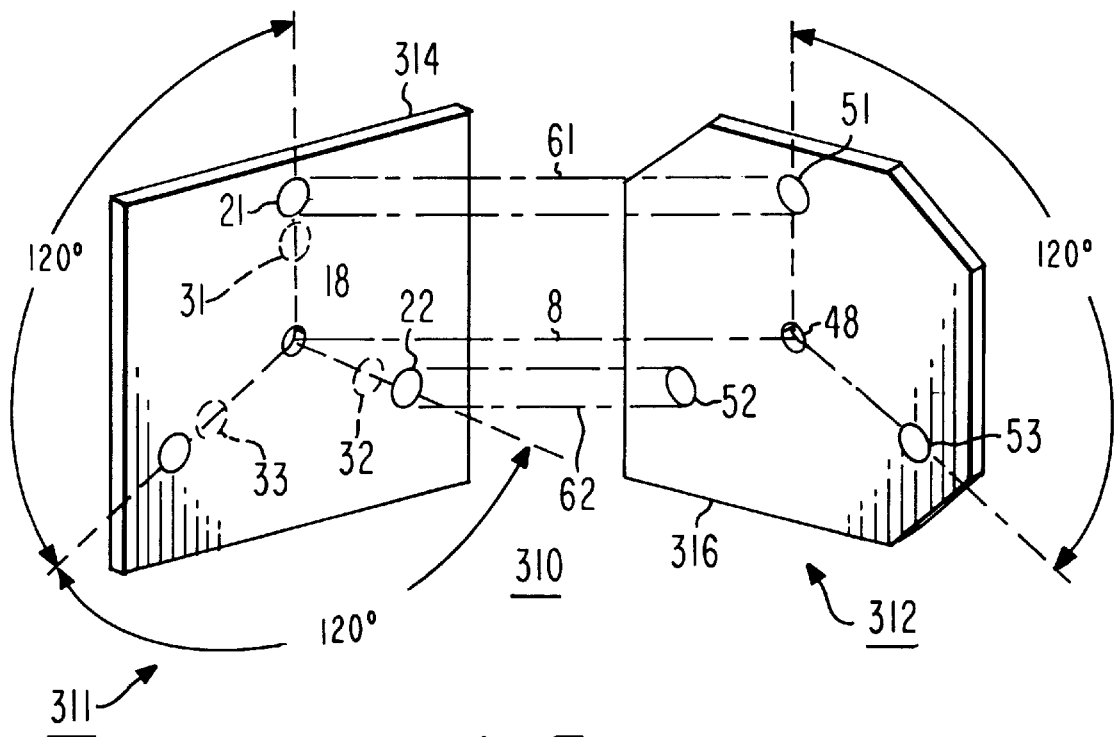
FIG. 3 is a simplified perspective or isometric view of first and second portions of an instrument according to an aspect of the invention in which the mountings of the first and second portions are of different shapes, and in which three magnetic generators and magnetic sensors are used.

FIG. 3 illustrates an instrument 310, which includes a first portion 311 and a second portion 312. First portion 311 includes a mounting designated 314, because it differs from the mountings previously described, in that it is square. This merely illustrates that the circular shape of the mountings of FIGS. 1a, 1b, and 2 are not of significance in themselves, and other shapes are possible. Second portion 312 includes a mounting 316, which differs from mounting 16 in that not only is it not circular, but its shape and size do not correspond with those of mounting 314. This merely indicates that the shape of the mounting is irrelevant, only the positions of the magnetic sensors and the magnetic field generators are of significance.

The arrangement of FIG. 3 differs from those of FIGS. 1a, 1b and FIG. 2 in another particular. The arrangement of FIG. 3 has three magnetic sensors 21, 22, and 23 affixed to mounting 314, equidistant from marking aperture 18, and at 120° rotation relative to each other. As in the case of the arrangements of FIGS. 1a, 1b and FIG. 2, each of the sensors is associated with a corresponding indicator. More particularly, sensor 21 of FIG. 3 is associated with an indicator 31, sensor 22 is associated with an indicator 32, and additional sensor 23 is associated with a further indicator 33. The arrangement of FIG. 3 has an advantage compared with the arrangements of FIGS. 1a, 1b and FIG. 2, in that, once the initial location is accomplished by achieving a maximum indication from one of the three indicators 31, 32, or 33, the final location of the first portion, congruent with the second portion, is achieved by simply rotating the first portion by 120°.

As so far described, the mountings are plastic or other nonmagnetic material in essentially the form of a sheet, so that the surfaces 16, 46 are essentially planar. The planar nature is required only in the vicinity of the mountings of the sensors, as illustrated in FIGS. 4a and 4b. In FIGS. 4a and 4b, the mounting 414 of the first portion 411 of an instrument (not completely illustrated) has three peaks, illustrated as 401, 402, and 403, rising above a mounting base illustrated as 400. With this arrangement, peak 401 has a flat upper surface 416a, peak 402 has a flat upper surface 416b, and peak 403 has a flat upper surface 416c. Flat upper surfaces 416a, 416b, and 416c lie in the same plane 17. Sensors 21, 22, and 23 lie on flat upper surfaces 416a, 416b, and 416c, respectively. Thus, the requirements for a planar surface for the first portion are met by the arrangement of FIGS. 4a and 4b, even though the sensors are on peaks (or in an alternative view even though there are valleys between the sensors). The magnetic field generators may similarly be on a mounting having peaks or valleys.

Figure 6A:
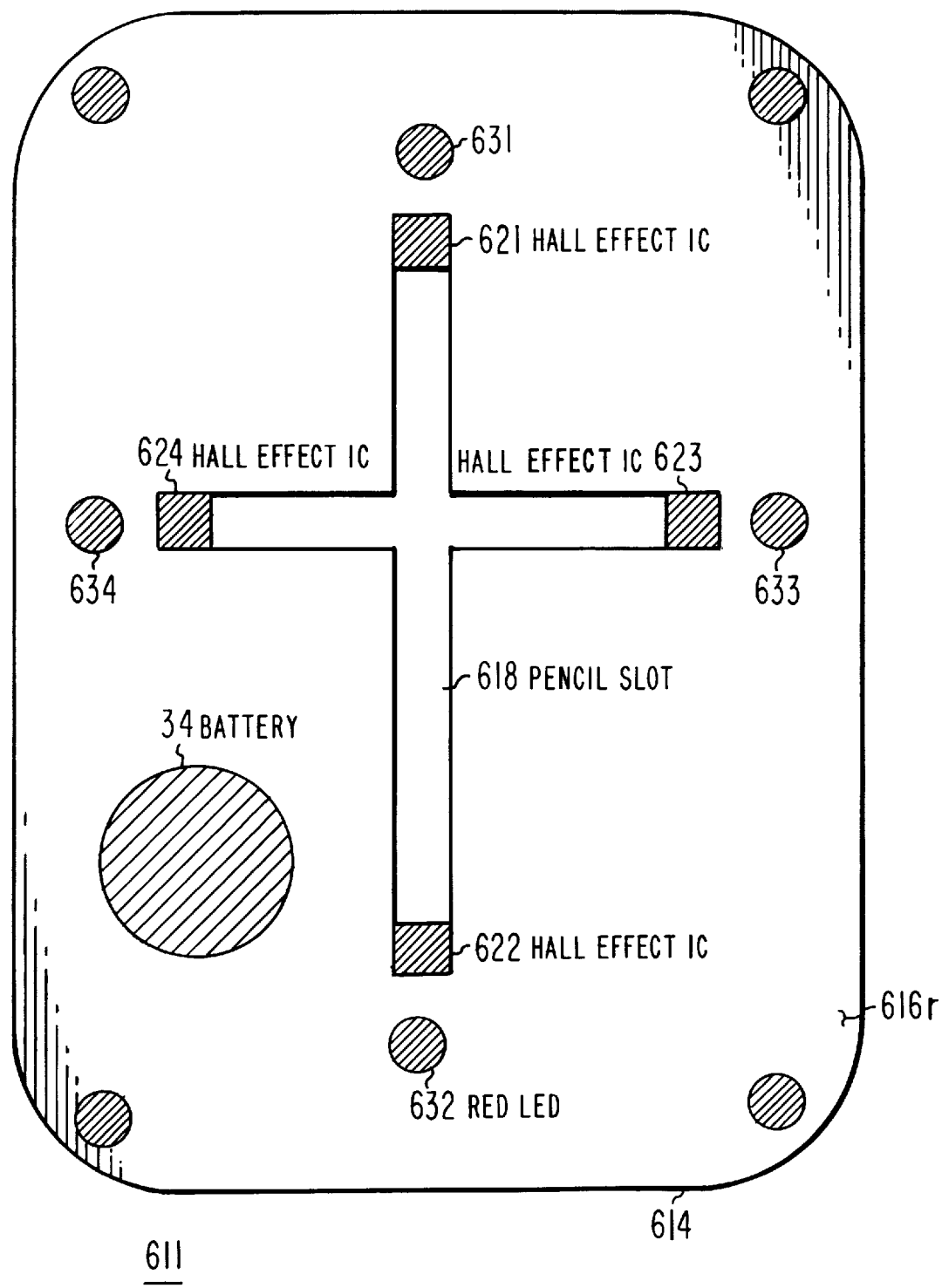
FIGS. 6a and 6b are views of the first and second portions, respectively, of a preferred embodiment of an instrument according to the invention.
Figure 6B:
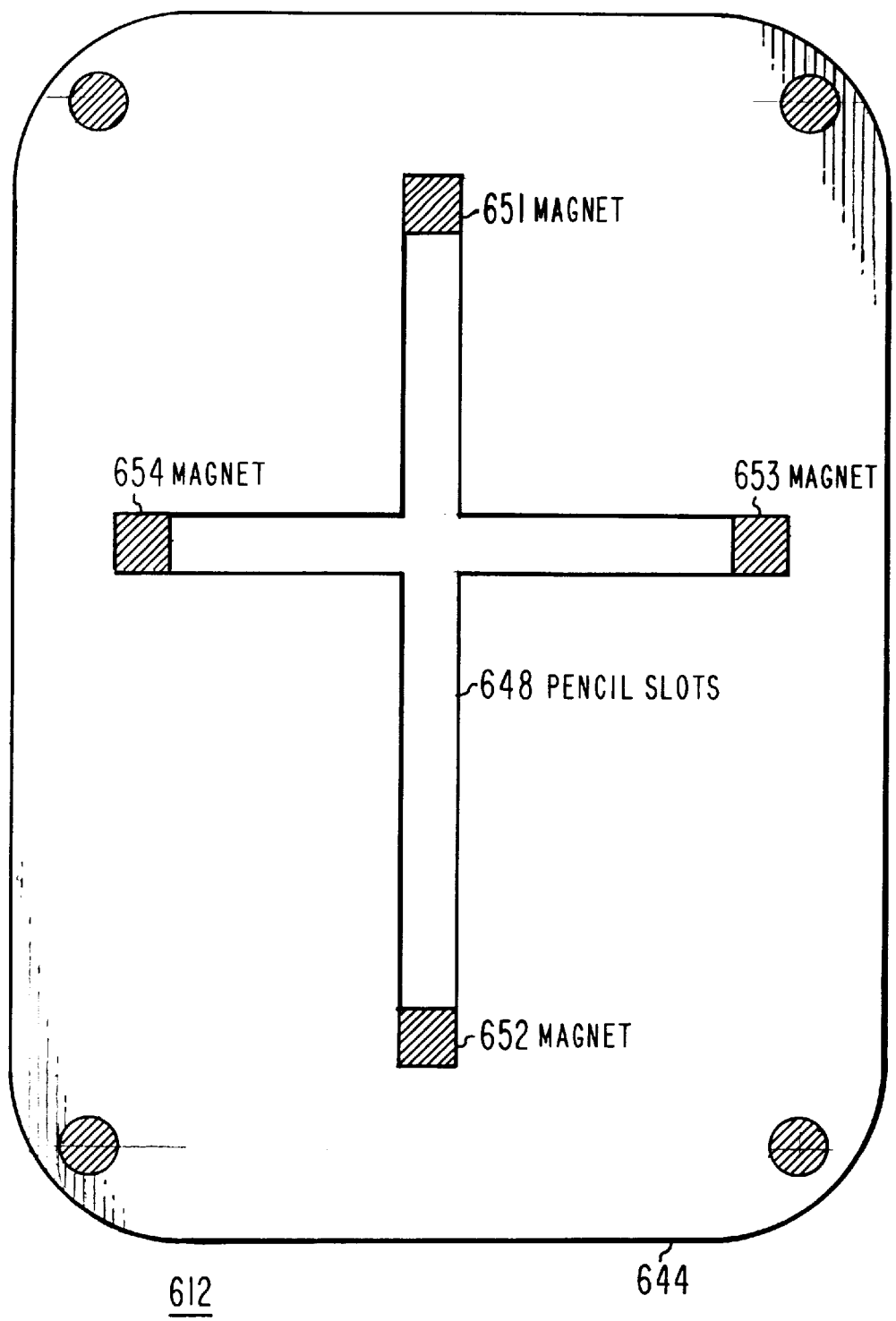

FIGS. 6a and 6b together illustrate a preferred embodiment of the instrument according to the invention, in which elements corresponding to those of FIGS. 1a, 1b, and FIGS. 2 and 3 are designated by like reference numerals, or by like reference numerals in the 600 series. More particularly, FIG. 6a illustrates the reverse surface 616r of the first portion 611 of the preferred form of the instrument. The mounting 614 of the first portion 611 of the preferred instrument is in the form of a printed-circuit board. Battery 34 is mounted on the board 614, and connections are made to printed-circuit conductors or traces (not illustrated) which are included within the controller, and which connect to the hall-effect magnetic sensors or integrated circuits 621, 622, 623, and 624, and to the associated indicator LEDs 631, 632, 633, and 634. The sensors 623 and 624 are mounted at locations which are diametrically opposed in the horizontal direction, while sensors 621 and 622 lie on a hypothetical vertical line which bisects the hypothetical line joining sensors 623 and 624. Two crossed line slots, designated together as 618, are dimensioned to allow a pencil to mark the underlying surface.

Second portion 612 of the preferred instrument is illustrated in FIG. 6b as including a mounting in the form of a dielectric board 644. This is essentially a printed-circuit board without any printing. The arrangement of second portion 612 includes four magnets 651, 652, 653, and 654 arranged at locations which are projections of, or correspond to, the locations of the sensors of FIG. 6a. A pair of crossed pencil slots, designated together as 648, allow marking of the underlying surface. Alternatively, if the underlying surface includes a marking, it allows the marking to be viewed, and the second portion 612 to be placed with the hypothetical vertical and horizontal lines joining magnet pairs 651, 652 and 653, 654 crossing at the mark.

FIGS. 7a AND 7b together illustrate another embodiment of the invention. In FIG. 7a, the first portion includes crossed slots similar to those described in conjunction with FIGS. 6a and 6b. FIGS. 7a and 7b show that the second portion 712 of the instrument 10 has a small protrusion which allows a mark to be made on a soft wall by applying pressure to, or hammering on, the second portion 712 when the correct position is achieved.

Elements of FIG. 8 corresponding to those of FIG. 1c are designated by corresponding reference numerals. In FIG. 8, magnetic sensor 21 has a flux concentrator 885 mounted on that side of sensor 21 facing away from structure G and magnetic source 51, to aid in extending or concentrating the magnetic field lines, illustrated as 883. Flux concentrator 885 is made from magnetically "soft" material, such as highly permeable iron, steel, or alloy.

Other embodiments of the invention will be apparent to those skilled in the art. For example, a power supply including a line cord for connection to the power mains may be used instead of a battery 34 for powering the instrument. It should be noted that if the resistance of the magnetic sensors 21, 22 of FIG. 5 increases in the presence of a magnetic field, the light produced by the associated indicator 31, 32 will decrease, while if the resistance of the magnetic sensors 21, 22 decreases in the presence of a magnetic field, the light produced by indicators 31, 32 will increase with the approach of coincidence of the two portions of the instrument 10. While the description of the operation of the instrument of FIGS. 1a, 1b, and 1c requires moving only one of the portions, those skilled in the art realize that both portions may be moved. While the locations of the magnetic field sensors and the magnetic field generators has been illustrated and described generally as adjacent to the surfaces 16, 46 of the mountings 14, 44 of the first and second portions 11 and 12, respectively, of the instrument 10, those skilled in the art will realize that, because of the nonmagnetic structure surrounding these elements, they may be adjacent (flush with) the surfaces 16, 46, or they may lie within (as, for example, embedded in plastic) the material of the mountings, or they may be on the reverse surfaces 16r, 46r, so long as the mountings are not so thick that the magnetic fields from the generators are excessively diffuse at the locations of the sensors. While the sensors and magnetic field generators have been described in FIGS. 4a and 4b as being mounted on peaks of the mounting surface, they could instead be mounted in valleys of the surface, if convenient.

Thus, a bipartite instrument (10) according to an aspect of the invention is used for establishing coincident locations on both sides of a structure (6) having first ($6_1$) and second ($6_2$) opposed surfaces. The instrument (10) includes (A) a first portion (11), which first portion includes a mounting (14) defining a generally planar (17) mounting surface (16; 16a, 16b, 16c), and a first marking arrangement (18) for marking a surface placed adjacent to the planar mounting surface (16; 16a, 16b, 16c). The first portion and the second portion are separate items which are capable of being moved independently of each other. The first portion of the instrument also includes first (21) and second (22) magnetic field sensors mounted, at disparate locations equidistant from the first marking arrangement (18), adjacent the surface (16; 16a, 16b, 16c) of the first portion (11) of the instrument. Each of the sensors (21, 22) is electrically responsive to the presence of a magnetic field, by producing an electrical signal or changing resistance or other electrical characteristic. The first portion of the instrument further includes first (31) and second (32) electrically operated indicators associated with each of the first (21) and second (22) sensors, respectively, for, when electrically actuated, producing a sensible indication. The first portion of the instrument further includes a source (35) of electrical energy, such as a battery or a mains-operated power supply, and a controller (36) coupled to the first (21) and second (22) sensors, to the first (31) and second (32) indicators, and to the source (35) of electrical energy, for responding to the electrical response of each of the first (21) and second (22) sensors by energizing the first (31) and second (32) indicators, respectively.

The second portion (12) of the instrument includes a mounting (44) defining a generally planar mounting surface (46), and a second marking arrangement (48) for marking a surface placed adjacent to the planar mounting surface (46) of the second portion (12) of the instrument (10). First (51) and second (52) magnetic field generators are mounted adjacent to the surface (46) of the second portion (12) of the instrument (10), at locations substantially congruent (projections 61, 62) with the locations of the first (21) and second (22) sensors under conditions in which (a) the planar mounting surfaces (16, 46) of the first (11) and second (12) portions of the instrument (10) are juxtaposed, with the first (18) and second (48) marking arrangement registered, and (b) the first (16; 16a, 16b, 16c) and second (46) surfaces are relatively rotated to register the first (21) sensor with the first (41) magnetic field generator.

In a particular embodiment of the invention, at least one of the first (41) and second (42) magnetic field generators comprises a permanent magnet.

In another embodiment of the invention, at least one of the first (18) and second (48) marking arrangements comprises an aperture extending through its corresponding mounting (14, 44), with the aperture being sufficiently large to accommodate a marking implement (26) such as a pencil or scribe. In a particularly advantageous embodiment of the invention, the locations of the first marking arrangement and the first and second sensors lie in a straight line (211). The first (41) and second (42) magnetic field generators are preferably dimensioned (in terms of magnetic field strength) to produce substantially identical magnetic fields, and the first (21) and second (22) sensors are selected or adjusted to have substantially identical responses to the magnetic fields.

The most advantageous embodiment of the invention includes at least three sensors on the first portion, and three magnetic field generators at corresponding locations on the second portion, for providing an indication in two mutually dimensions.

A method according to an aspect of the invention identifies corresponding locations on either side of a substantially planar object (6) including first (6$_1$) and second (6$_2$) mutually parallel first and second broad walls. The method comprising the step of selecting a first location on the first broad wall of the object, for which the corresponding location on the second broad wall is to be located, and placing a first portion of a bipartite instrument adjacent the first broad surface of the object. The first portion of the bipartite instrument comprises (a) a mounting defining a generally planar mounting surface, and a first marking arrangement for marking a surface placed adjacent to the planar mounting surface of the first portion of the instrument, (b) first and second magnetic field sensors mounted, at disparate locations equidistant from the first marking arrangement, adjacent the surface of the first portion of the instrument, with each of the sensors being electrically responsive to the presence of a magnetic field, (c) first and second electrically operated indicators associated with each of the first and second sensors, respectively, for producing a sensible indication when electrically actuated (d) a source of electrical energy, and (e) a controller coupled to the first and second sensors, the first and second indicators, and to the source of electrical energy, for responding to the electrical response of each of the first and second sensors by energizing the first and second indicators, respectively, with the first marking arrangement over one of the first location on the first broad surface and the corresponding location on the second broad surface. The method further includes the step of placing a second portion of the bipartite instrument adjacent the other one of the first location on the first broad surface and the corresponding location on the second broad surface of the object. The second portion of the bipartite instrument comprises (f) a mounting defining a generally planar mounting surface, and a second marking arrangement for marking a surface placed adjacent to the planar mounting surface of the mounting of the second portion of the instrument, (g) first and second magnetic field generators mounted adjacent to the surface of the second portion of the instrument, at locations substantially congruent with the locations of the first and second sensors under conditions in which (a) the planar mounting surfaces of the first and second portions are juxtaposed with the first and second marking arrangement registered and (b) the first and second surfaces are relatively rotated to register one of the first and second marking arrangement, at a location at which at least on of the first and second indicators gives an indication. The method further includes the step of adjusting the position of at least one of the first and second portions of the instrument until both the first and second indicators provides an indication, followed by the step of marking one of the first and corresponding locations by use of the marking arrangement.

In a particular mode of the method, the locations of the first marking arrangement and the first and second sensors lie in a straight line, and the straight line is one of vertical and horizontal; and the method includes the step of adjusting the position includes the step of moving the one of the first and second portions with the straight line held the one of vertical and horizontal.

In a further mode of the method according to the invention, at least one of the first and second marking arrangements comprises an aperture extending through the mounting sufficiently large to accommodate a marking implement, and the step of marking comprises the step of marking one of the first and second broad surfaces through the aperture.

What is claimed is:

1. A bipartite instrument for establishing coincident locations on both sides of a structure having first and second opposed surfaces, said instrument comprising:
   (a) a first portion and second portion including;
      a mounting defining a generally planar mounting surface, and first marking means for marking a surface placed adjacent to said planar mounting surface;
      first and second magnetic field sensors mounted, at disparate locations equidistant from said first marking means, adjacent said surface of said first portion, each of said sensors being electrically responsive to the presence of a magnetic field;
      first and second electrically operated indicators associated with each of said first and second sensors, respectively, for producing a sensible indication when electrically actuated;
      a source of electrical energy;
      control means coupled to said first and second sensors, said first and second indicators, and to said source of electrical energy, for responding to the electrical response of each of said first and second sensors by energizing said first and second indicators, respectively;
   (b) said second portion, movable independently of said first portion, said second portion including;
      a mounting defining a generally planar mounting surface, and second marking means for marking a surface placed adjacent to said planar mounting surface of said second portion of said instrument;
      first and second magnetic field generators mounted adjacent to said surface of said second portion of said instrument, at locations substantially congruent with said locations of said first and second sensors under conditions in which (a) said planar mounting surfaces of said first and second portions of said instrument are juxtaposed, with said first and second marking means registered, and (b) said first and second surfaces are relatively rotated to register said first sensor with said first magnetic field generator.

2. An instrument according to claim 1, wherein at least one of said first and second magnetic field generators comprises a permanent magnet.

3. An instrument according to claim 1, wherein at least one of said first and second marking means comprises an aperture extending through its corresponding mounting, said aperture being sufficiently large to accommodate a marking implement.

4. An instrument according to claim 1, wherein said locations of said first marking means and said first and second sensors lie in a straight line.

5. An instrument according to claim 1, wherein said first and second magnetic field generators are dimensioned to produce substantially identical magnetic fields, and said first and second sensors have substantially identical responses to said magnetic fields.

6. An instrument according to claim 1, further comprising a further sensor mounted on said mounting of said first portion.

7. An instrument according to claim 1, further comprising a magnetic flux concentrator associated with at least one of said first and second magnetic field sensors.

8. A method for identifying corresponding locations on either side of a substantially planar object including first and second mutually parallel first and second broad walls, said method comprising the steps of:

selecting a first location on said first broad wall of said object, for which the corresponding location on said second broad wall is to be located;

placing a first portion of a bipartite instrument adjacent said first broad surface of said object, said first portion of said bipartite instrument comprising
  (a) a mounting defining a generally planar mounting surface, and first marking means for marking a surface placed adjacent to said planar mounting surface of said first portion of said instrument;
  (b) first and second magnetic field sensors mounted, at disparate locations equidistant from said first marking means, adjacent said surface of said first portion, each of said sensors being electrically responsive to the presence of a magnetic field;
  (c) first and second electrically operated indicators associated with each of said first and second sensors, respectively, for producing a sensible indication when electrically actuated;
  (d) a source of electrical energy; and
  (e) control means coupled to said first and second sensors, said first and second indicators, and to said source of electrical energy, for responding to the electrical response of each of said first and second sensors by energizing said first and second indicators, respectively, with said first marking means over one of said first location on said first broad surface and said corresponding location on said second broad surface;

placing a second portion of said bipartite instrument adjacent the other one of said first location on said first broad surface and said corresponding location on said second broad surface of said object, said second portion of said bipartite instrument comprising
  (f) a mounting defining a generally planar mounting surface, and second marking means for marking a surface placed adjacent to said planar mounting surface of said mounting of said second portion of said instrument;
  (g) first and second magnetic field generators mounted adjacent to said surface of said second portion of said instrument, at locations substantially congruent with said locations of said first and second sensors under conditions in which (a) said planar mounting surfaces of said first and second portions are juxtaposed with said first and second marking means registered and (b) said first and second surfaces are relatively rotated to register one of said first and second marking means at a location at which at least on of said first and second indicators gives an indication; and adjusting the position of at least one of said first and second portions of said instrument until both said first and second indicators provides an indication; and marking one of said first and corresponding locations by use of said marking means.

9. A method according to claim 8, wherein;

said locations of said first marking means and said first and second sensors lie in a straight line, which straight line is one of vertical and horizontal; and said step of adjusting the position includes the step of moving said one of said first and second portions with said straight line held said one of vertical and horizontal.

10. A method according to claim 9, wherein at least one of said first and second marking means comprises an aperture extending through said mounting sufficiently large to accommodate a marking implement, and said step of marking comprises the step of marking one of said first and second broad surfaces through said aperture.

* * * * *